(No Model.)
C. H. TERRY.
CAR COUPLING.
No. 339,711. Patented Apr. 13, 1886.
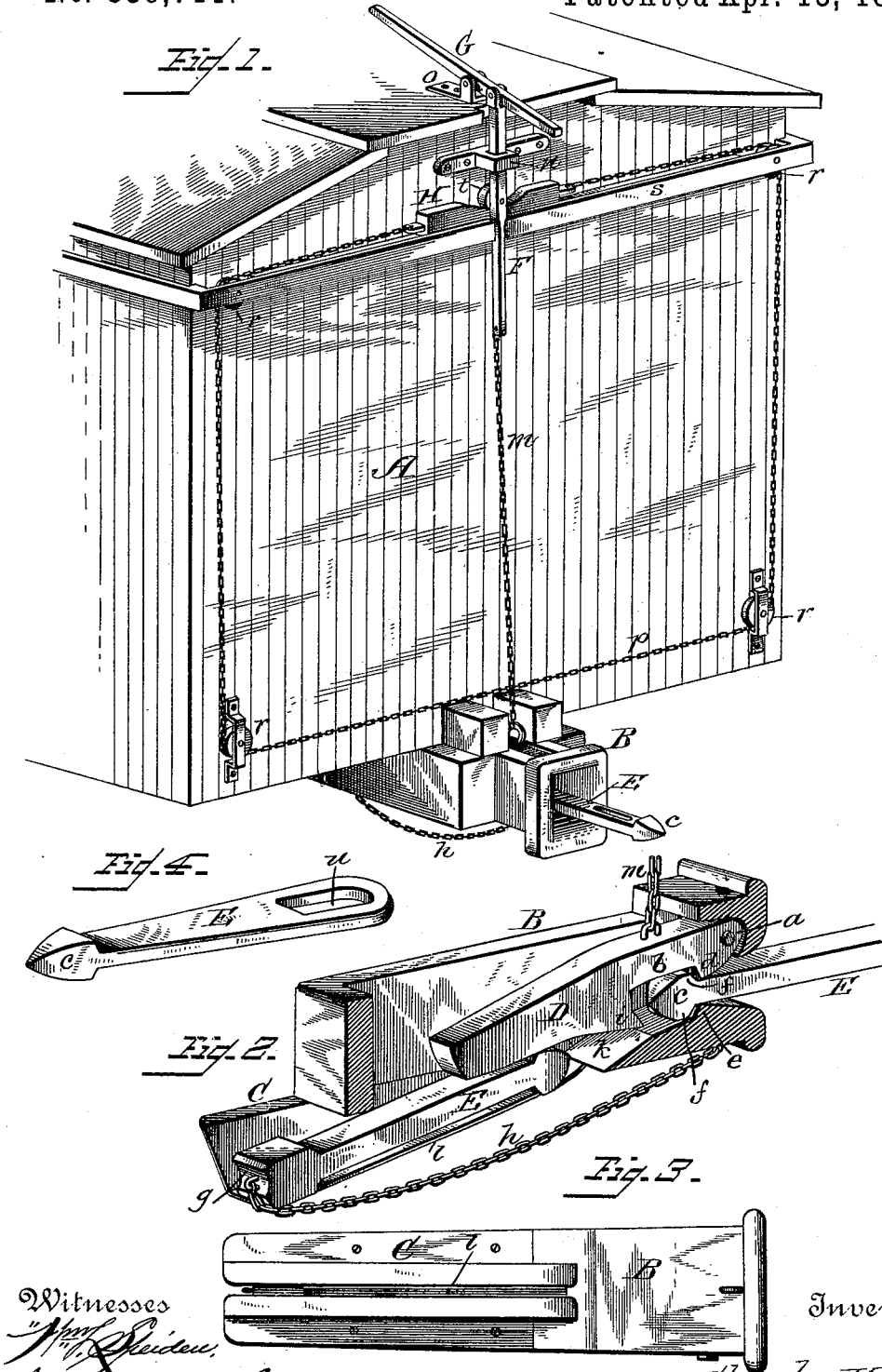
Witnesses
Inventor
Charles H. Terry.
By his Attorney
Chas. H. Fowler.

UNITED STATES PATENT OFFICE.

CHARLES H. TERRY, OF RIGA, NEW YORK.

CAR-COUPLING.

SPECIFICATION forming part of Letters Patent No. 339,711, dated April 13, 1886.

Application filed February 12, 1886. Serial No. 191,691. (No model.)

*To all whom it may concern:*

Be it known that I, CHARLES H. TERRY, a citizen of the United States, residing at Riga, in the county of Monroe and State of New York, have invented certain new and useful Improvements in Car-Couplings; and I do hereby declare that the following is a full, clear, and exact description of the same, reference being had to the annexed drawings, making a part of this specification, and to the letters and figures of reference marked thereon.

Figure 1 of the drawings is a perspective view of one end of a car with my invention applied thereto; Fig. 2, a sectional perspective view of the draw-head, showing the coupling-links and pivoted dog in elevation; Fig. 3, an under plan view of the draw-head; and Fig. 4, a detail view in perspective, showing a modification of the coupling-link.

The present invention has for its object to provide a simple and effective automatic coupling device for railroad-cars; also means whereby the uncoupling of the cars can be readily and expeditiously effected, which objects I attain by the construction substantially as shown in the drawings, and hereinafter described and claimed.

In the accompanying drawings, A represents one end of a car, to which is suitably connected the draw-head B, provided upon its under side with a slotted chute, C, extending preferably beyond the rear end of the draw-head, as shown.

Within the draw-head B is located a weighted dog, D, pivoted at its front end, as shown at *a*, and formed with a recess, *b*, to receive the head *c* on the link E of the opposing draw-head. The dog D, immediately in front of the recess *b*, has an outwardly-inclined shoulder, *d*, and the bottom of the draw-head B is formed with a similar shoulder, *e*. Against the shoulders *d e* abut the shoulders *f* on the head *c* of the coupling-link, the shoulders thereon being inclined in opposite directions to those on the dog and draw-head. The inclination of these shoulders facilitates the withdrawal of the coupling-link when uncoupling the cars, especially when going up a steep grade, as by simply raising the dog a sufficient distance the shoulders on the head of the link will act as wedges to elevate the dog to the extent required to allow the head of the coupling-link or draw-bar to pass out of the draw-head. The opposite end of the draw-bar or coupling-link E has a grooved head, *g*, and is permanently attached to the draw-head B by a suitable chain, *h*, one end thereof being secured to the grooved head, and the opposite end of the chain to the under side of the draw-head near its front end. The link or rod E, when not in use, is located within the chute C and resting on the bottom thereof, as shown in Fig. 2, and when required for use it is brought forward by means of the chain *h* until the rod or link is in a horizontal position and the spur *i* on the dog D resting in the grooved head *g*, this preventing the coupling link or bar from sliding back. The draw-head B is formed inclined, as shown at *k*, to form a continuation of the chute C, and the slot *i* in the chute is to allow the chain *h* to pass, when drawing up the link or bar E, into a coupling position to engage with the opposing draw-head, the link or bar attached thereto not being in use, but drawn back into the chute. The dog D has connected to it a suitable chain, *m*, for raising it, the opposite end of said chain being attached to the lower end of an upright rod, F, which extends up through a guide-bracket, *n*, secured to the end of the car. The upper end of the rod F has pivoted to it a lever, G, adapted for operation by either the foot or hand of the attendant, said lever being pivoted to a bracket, *o*, secured to the top of the car. The lever projects some distance over the car, as shown, enabling it to be reached from the end of the car opposite by brakeman or other employé of the road. The rod F may be operated from either side of the car by means of the endless chain *p*, which extends over grooved pulleys *r*, attached to the end of the car, as shown. The ends of the chain *p* are attached to a double-faced cam-block, H, supported on a rail, *s*, a friction-roller, *t*, on the rod F resting on said block, and by taking hold of the chain at either side of the car and pulling down thereon the cam-block will be moved along the rail laterally, and the face of the cam pressing against the roller will raise the rod sufficiently to elevate the pivoted dog.

I have shown in Fig. 4 a modification of the link or coupling-bar, which has at one end a slot, *u*, so as to adapt one end thereof to be used in connection with the ordinary draw-head and coupled thereto by the usual coupling-pin, a slot being also formed in the link or bar immediately back of the shouldered head c, thereby enabling it to be used with the ordinary coupling-pin or with the dog, as found preferable, this construction being shown in Fig. 1.

Having now fully described my invention, what I claim as new, and desire to secure by Letters Patent, is—

1. In a car-coupling, a draw-head formed with a shoulder at its inner bottom side and inclining outwardly, and a coupling link or bar having a head formed with correspondingly-inclined shoulders, in combination with a weighted dog pivoted at its front end and formed with a recess to receive the head of the link or bar, and a shoulder corresponding to the inclination of the shoulder on the head of the link or bar, substantially as and for the purpose set forth.

2. In a car-coupling, the combination, with a draw-head provided with a pivoted dog having a recess and shoulder, as shown, of a slotted chute upon the under side of the draw-head, and which extends back beyond the rear end thereof, and a coupling link or bar adapted to rest therein, and a chain connected to the rear end of the link or bar, and the opposite end attached to the under side of the draw-head, substantially as and for the purpose specified.

3. In a car-coupling, the combination, with the draw-head thereof and pivoted dog, of means for elevating said dog, consisting of an upright rod carrying a friction-roller and an endless chain extending around pulleys, and a double cam-block, to which the ends of the endless chain are connected, and a chain connecting the rod with the dog, substantially as and for the purpose specified.

In testimony that I claim the above I have hereunto subscribed my name in the presence of two witnesses.

CHAS. H. TERRY.

Witnesses:
CHAS. H. HEDLEY,
J. W. HAMILTON JOHNSON.